US011470762B2

(12) United States Patent
Husson

(10) Patent No.: US 11,470,762 B2
(45) Date of Patent: Oct. 18, 2022

(54) AGRICULTURAL MACHINE AND FOLDING METHOD FOR AN AGRICULTURAL MACHINE

(71) Applicant: KUHN S.A., Saverne (FR)

(72) Inventor: Geoffroy Husson, Ottersthal (FR)

(73) Assignee: KUHN S.A., Saverne (FR)

(*) Notice: Subject to any disclaimer, the term of this patent is extended or adjusted under 35 U.S.C. 154(b) by 235 days.

(21) Appl. No.: 16/816,434

(22) Filed: Mar. 12, 2020

(65) Prior Publication Data
US 2020/0288624 A1 Sep. 17, 2020

(30) Foreign Application Priority Data
Mar. 13, 2019 (FR) ...................................... 19 02561

(51) Int. Cl.
*A01B 73/04* (2006.01)
*A01B 73/06* (2006.01)

(52) U.S. Cl.
CPC ............ *A01B 73/044* (2013.01); *A01B 73/06* (2013.01); *A01B 73/067* (2013.01)

(58) Field of Classification Search
CPC ...................... A01B 73/06–067; A01B 73/044
See application file for complete search history.

(56) References Cited

U.S. PATENT DOCUMENTS

| 5,839,516 A * | 11/1998 | Arnold et al. | ......... A01B 73/02 172/457 |
| 2010/0025056 A1 * | 2/2010 | Friggstad | ............. A01B 73/048 172/605 |
| 2010/0307779 A1 * | 12/2010 | Ryder et al. | ......... A01B 73/067 172/672 |
| 2011/0290514 A1 * | 12/2011 | Yuen | .................... A01B 73/048 60/484 |

(Continued)

FOREIGN PATENT DOCUMENTS

| EP | 1529430 A1 * | 5/2005 | ........... A01B 49/027 |
| EP | 1731012 A1 * | 12/2006 | ........... A01B 73/048 |
| FR | 2 805 434 A1 | 8/2001 | |

OTHER PUBLICATIONS

French Preliminary Search Report dated Nov. 11, 2019 in French Application 19 02561 filed on Mar. 13, 2019 (with English Translation of Categories of Cited Documents), 3 pages.

*Primary Examiner* — Tara Mayo-Pinnock
(74) *Attorney, Agent, or Firm* — Oblon, McClelland, Maier & Neustadt, L.L.P.

(57) ABSTRACT

An agricultural machine includes two side units and a chassis that extends in a longitudinal direction and is equipped with two wheels, each side unit being fitted to pivot in relation to the chassis around a folding axis parallel to a median plane of the chassis. Each side unit includes a tool unit connected to the chassis by an arm and being able to occupy a work position in which the length of the tool unit extends transversely to the longitudinal direction. Each side (Continued)

unit is also able to occupy a transport position in which the length and width of the tool unit are parallel to the median plane. The machine includes a tilter articulated with the chassis around one tilting axis oriented transversely to the longitudinal direction, and in the transport position of the side units, each tool unit is closer to the median plane than the respective arm.

9 Claims, 8 Drawing Sheets

(56) References Cited

U.S. PATENT DOCUMENTS

| | | | | |
|---|---|---|---|---|
| 2011/0290515 | A1* | 12/2011 | Yuen | A01B 73/048 |
| | | | | 60/484 |
| 2014/0033671 | A1 | 2/2014 | Halter et al. | |
| 2014/0034342 | A1* | 2/2014 | Friggstad | A01B 73/067 |
| | | | | 172/663 |
| 2016/0212927 | A1* | 7/2016 | Sudbrink et al. | A01B 73/065 |
| 2018/0064021 | A1* | 3/2018 | Sudbrink et al. | A01B 73/065 |
| 2018/0064022 | A1* | 3/2018 | Nininger | A01B 63/22 |

* cited by examiner

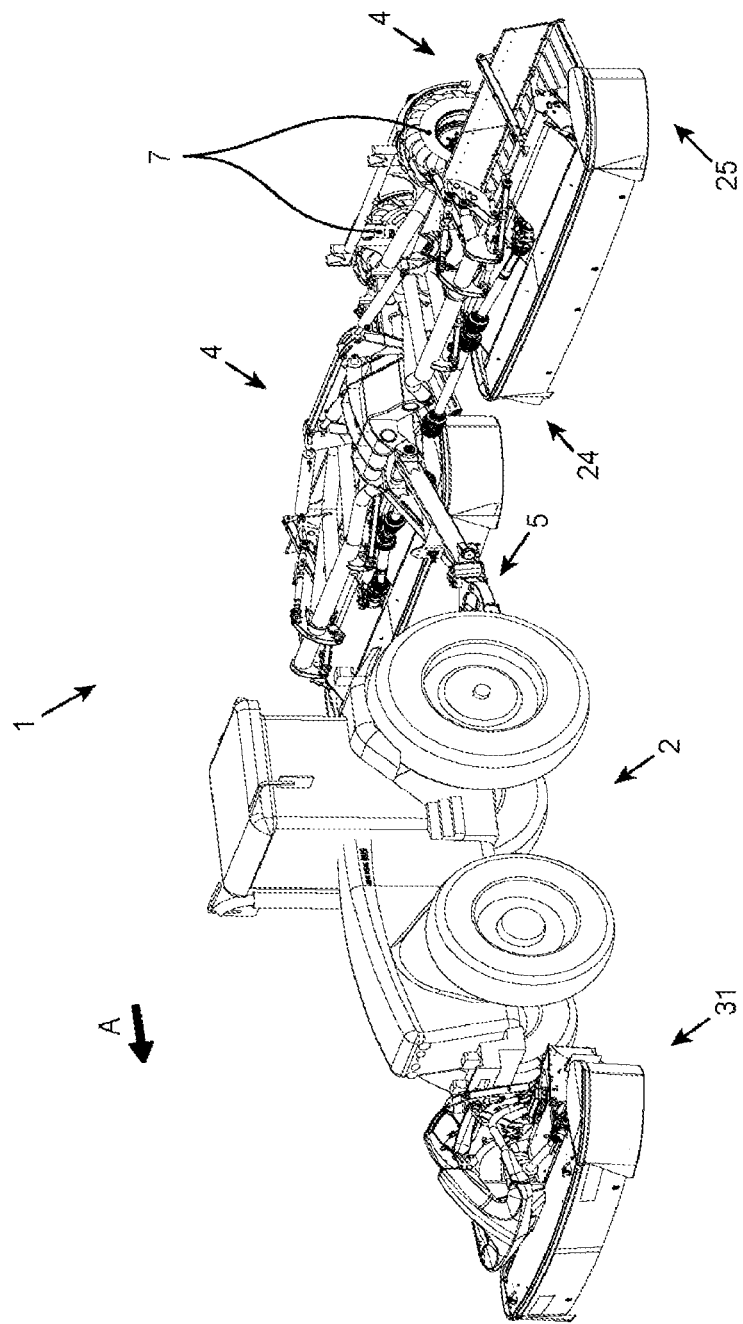
[Fig. 1]

[Fig. 2]
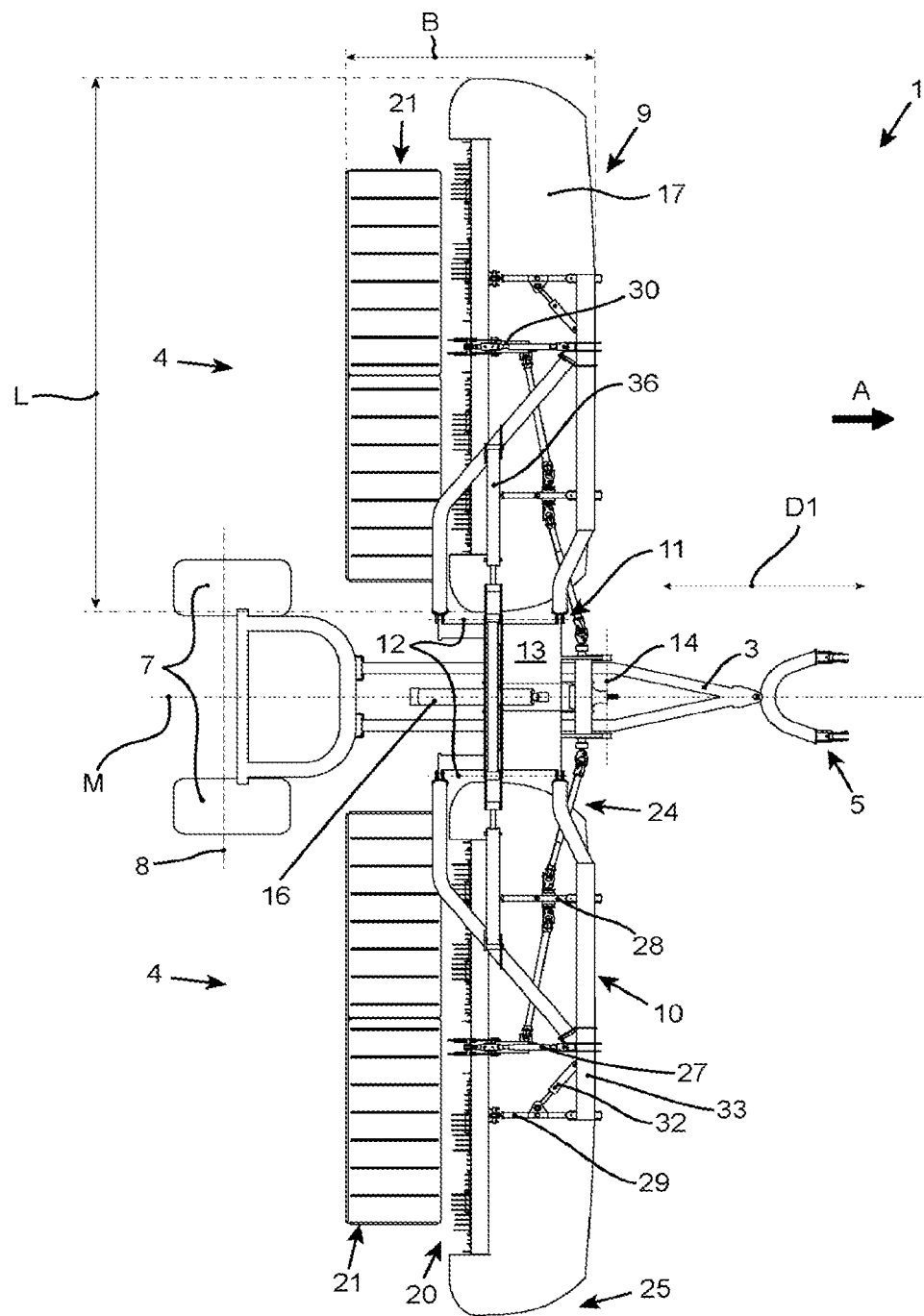

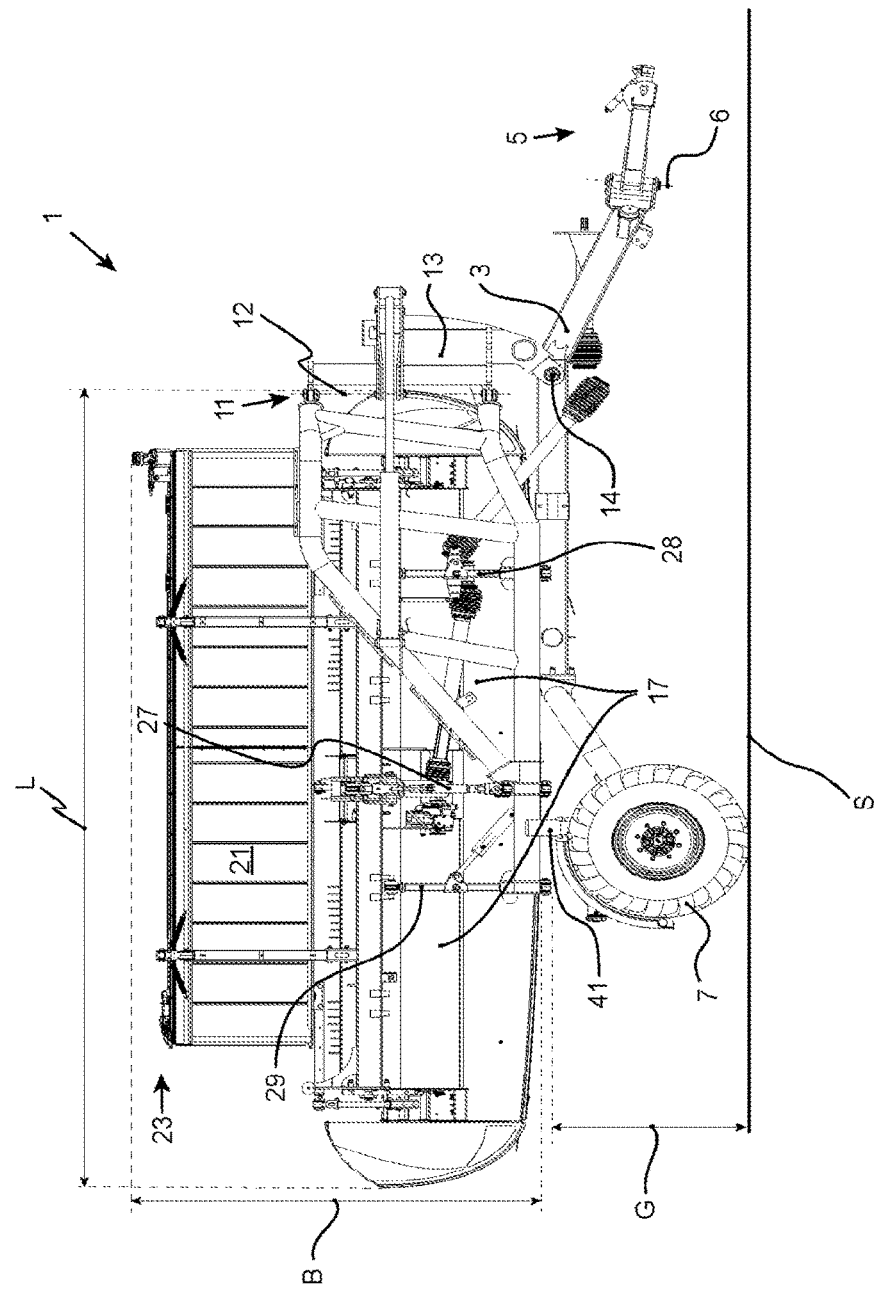
[Fig. 3]

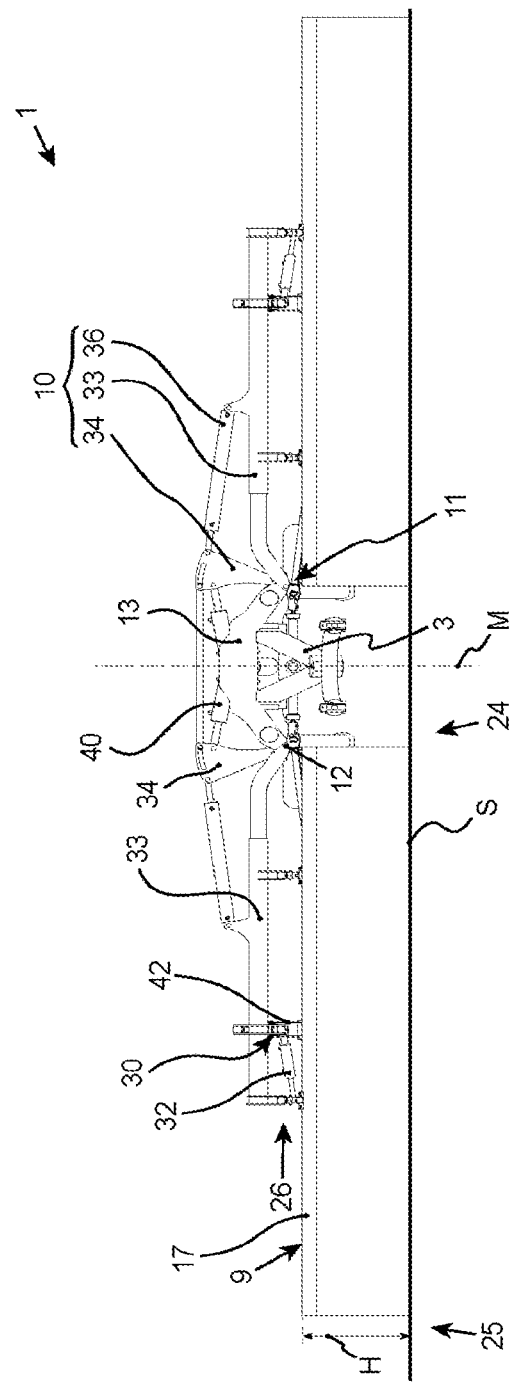
[Fig. 4]

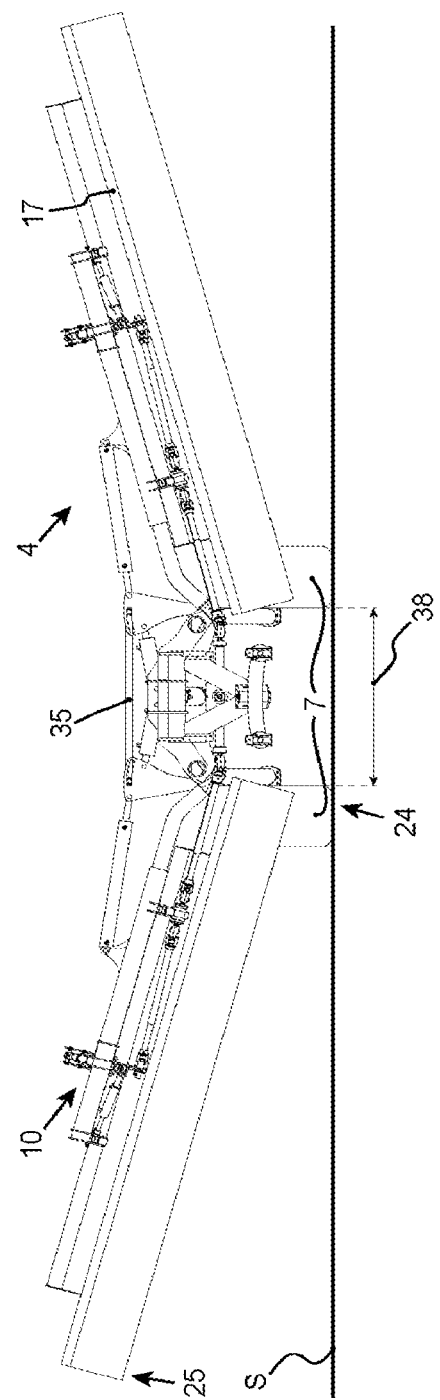
[Fig. 5]

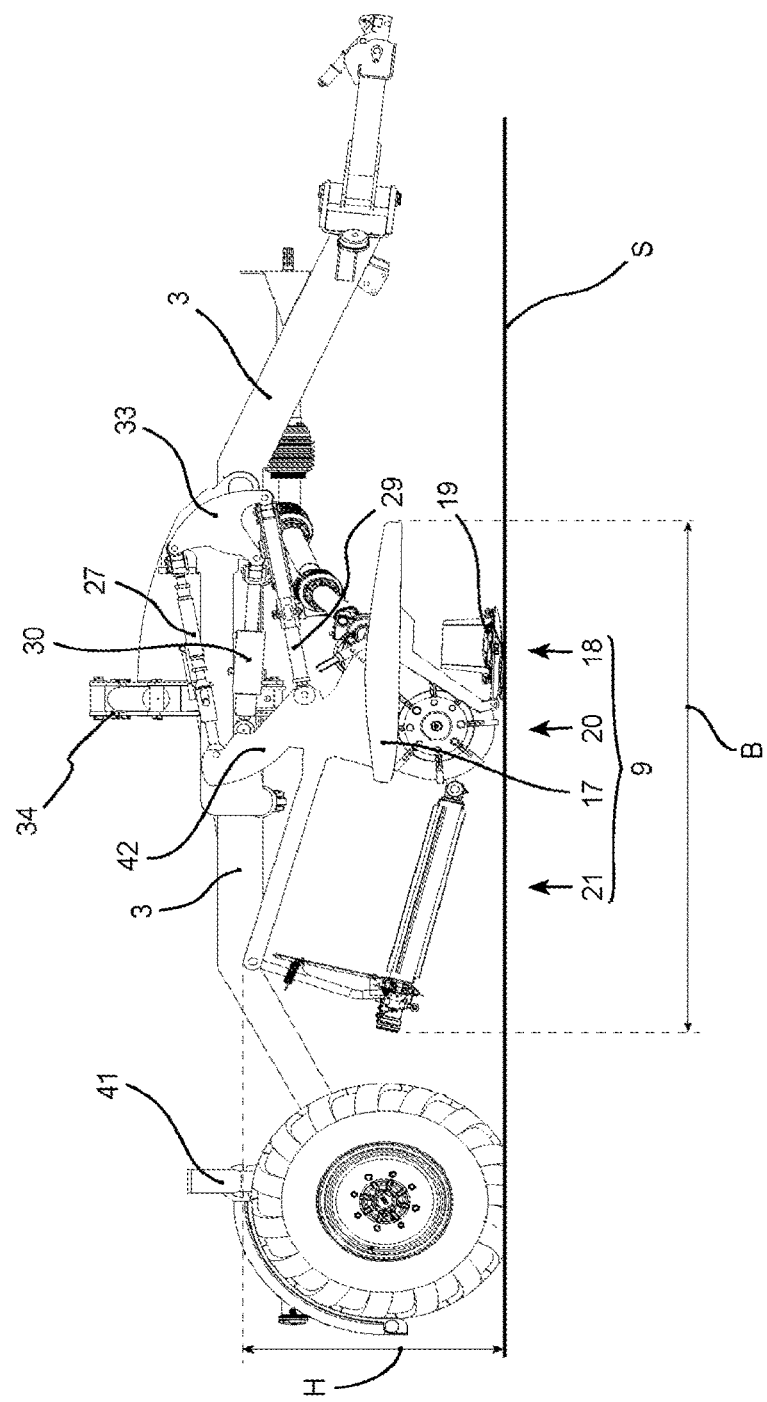
[Fig. 6]

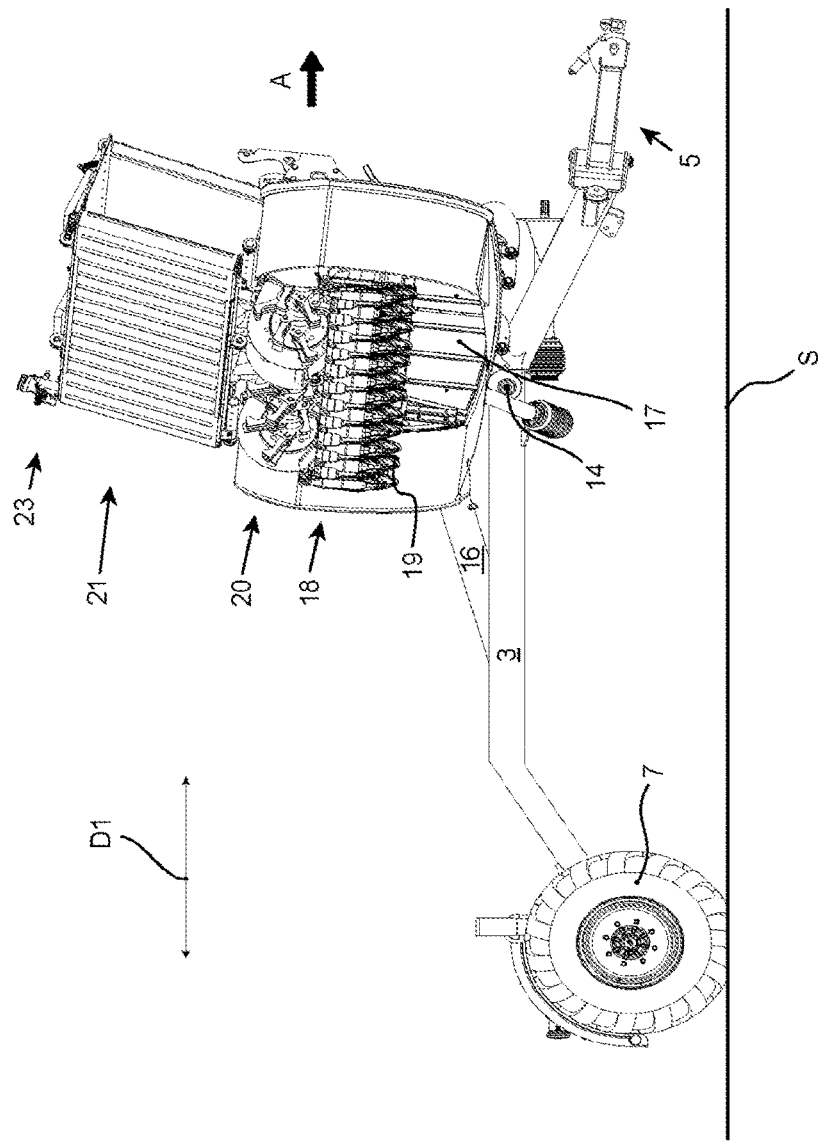
[Fig. 7]

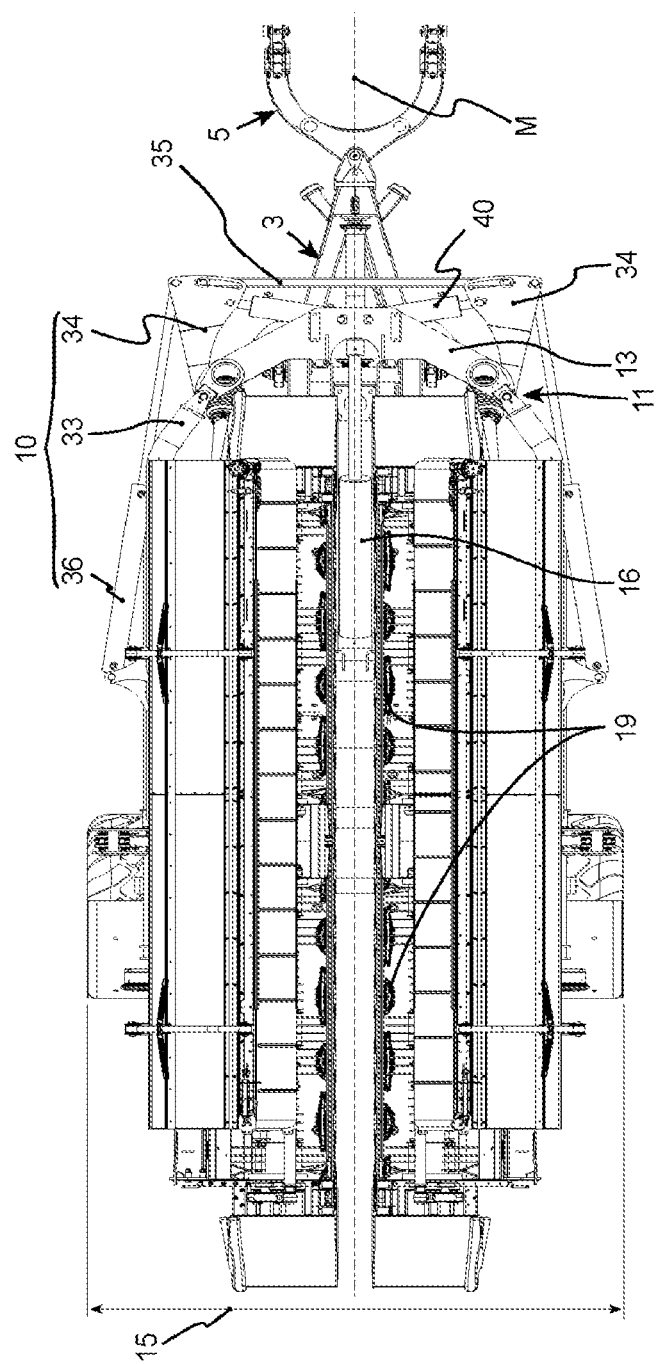
[Fig. 8]

AGRICULTURAL MACHINE AND FOLDING METHOD FOR AN AGRICULTURAL MACHINE

BACKGROUND OF THE INVENTION

Field of the Invention

The present invention relates to the general technical field of agricultural machinery. It relates more specifically to an agricultural machine intended to be hitched to a tractor and comprising two side units and a chassis that extends in a longitudinal direction and is equipped with two wheels, each side unit being fitted to pivot in relation to the chassis via a respective longitudinal joint around a respective folding axis parallel to a median plane of the chassis; each side unit comprising a tool unit attached to the chassis by a respective arm and being able to occupy a work position in which it rests on the ground and in which the length of the respective tool unit extends transversely to the longitudinal direction; each side unit being also able to occupy a transport position in which it is distanced from the ground and in which the length and width of the respective tool unit are substantially parallel to the median plane.

The invention also relates to a process for transposing a side unit of an agricultural machine between a work position and a transport position.

Discussion of the Background

Such an agricultural machine is known from the document EP 3 028 557 A1. This agricultural machine comprises two side units and a chassis equipped with wheels. Each side unit comprises a respective tool unit connected to the chassis by a respective arm. Each of the side units is fitted to pivot in relation to the chassis via a longitudinal joint around a folding axis parallel to a median plane of the chassis. For transport outside of the fields, the side units are folded so that the length and width of the tool units are substantially parallel to the median plane, such that they respect the legal transport width. When transposing side units between work position and transport position, each side unit is pivoted around the respective folding axis in the direction from the tool unit to the respective arm. The tool units as a result are located on the outside of the machine in the transport position, thus moving their centre of gravity further from the median plane. Such a feature induces a risk of tilting according to an axis parallel to the longitudinal direction, particularly in bends and/or slopes, which can cause damage to the machine and the tractor to which it is hitched, as well as injury to the user or people in the vicinity.

SUMMARY OF THE INVENTION

The purpose of the present invention is to propose an agricultural machine with improved safety of tool units in the transport position.

This goal is achieved by the articulation of at least one tilter with the chassis around at least one tilting axis positioned transversely to the longitudinal direction, and by the fact that in the transport position of the side units each tool unit is closer to the median plane than the respective arm.

Thanks to this feature in the transport position the centre of gravity of each tool unit is moved closer to the median plane. This machine is then more stable in its transport position, while keeping reduced dimensions of the machine in this position in order to respect the legal transport width.

Other features and advantages of the invention will become clear from the following description, along with references to the attached drawings, which show non-exhaustive example embodiments of the agricultural machine according to the invention.

BRIEF DESCRIPTION OF THE DRAWINGS

FIG. 1 shows a perspective view of a machine according to the invention in work position of the side units, and hitched to a tractor on the front of which a frontal equipment is also hitched.

FIG. 2 shows a top view of a machine according to the invention in the work position of the side units.

FIG. 3 shows a side view of a machine according to the invention in the transport position of the side units.

FIG. 4 shows a front view of a machine according to the invention in the working position of the side units.

FIG. 5 shows a front view of a machine in the operation position of the side units.

FIG. 6 shows a side view of a machine according to the invention in the work position of the side units.

FIG. 7 shows a side view of a machine according to the invention in the transitory position of the side units.

FIG. 8 shows a top view of a machine according to the invention in the transport position of the side units.

DESCRIPTION OF THE PREFERRED EMBODIMENT

In the following description, the notions "lower" and "upper" are defined relative to the ground S, and the notions "front", "rear", "in front" and "behind" are defined by looking in a direction of advance A. In this description, unless indicated otherwise, the directions described, particularly for axes and planes, are to be considered when the machine 1 and the tractor 2 move in a rectilinear manner in the direction of advance A on a flat and horizontal ground S, as shown on the appended figures.

As shown in FIG. 1, the agricultural machine 1 is intended to be hitched to a tractor 2. It is thus part of a rolling assembly consisting of the machine 1 and the tractor 2. The tractor 2 is able to move the machine 1 in a direction of advance A and to drive it. The machine 1 comprises a chassis 3 and two side units 4. It also comprises a hitching device 5 for attaching it to the tractor 2. The hitching device 5 is preferably located at the front end of the chassis 3 which is located behind the tractor 2 when the machine 1 is attached to it. The hitching device 5 comprises two lower pins designed to hook to the lower hitching arms of the tractor 2. The chassis 3 is furthermore articulated with the hitching device 5 around a hitching axis 6 that is substantially vertical, and preferably leaning slightly forwards. This hitching axis 6 allows the machine 1 to follow the tractor 2 without shifting on the ground S, which damages the plant cover and generates a major bending force in the chassis 3.

The chassis 3 is equipped with at least two wheels 7. They are fitted to pivot with the chassis 3 around a rolling axis 8 in order to transfer part of the weight of the machine 1 onto the ground S and make it easier to move in the direction of advance A. The rolling axis 8 is perpendicular to the direction of advance A.

Each side unit 4 comprises a tool unit 9 and an arm 10. Each tool unit 9 is connected to the chassis 3 by the respective arm 10. Each side unit 4, respectively each arm 10, is fitted to pivot in relation to the chassis 3 via a respective longitudinal joint 11 around a respective folding axis 12. Each tool unit 9 has an elongated shape and is similar to a quadrilateral, as shown on the FIGS. 4 and 5.

As shown in FIG. 2, the chassis 3 extends in the longitudinal direction D1. The longitudinal direction D1 is parallel to the direction of advance A and/or orthogonal to the rolling axis 8. The chassis 3 has a median plane M. The median plane M is oriented parallel to the longitudinal direction D1 and preferably vertical and/or perpendicular to the rolling axis 8. The median plane M passes through the hitching axis 6. The side units 4 may be symmetrical to the median plane M. In this document, the notion "inner" refers to a part of an element located closer to the median plane than an "outer" part.

Each side unit 4 may occupy a work position in which it, respectively the respective tool unit 9, rests on the ground S. The length L is the largest dimension of a tool unit 9. As shown on FIG. 2, the length L of a tool unit 9 in work position extends transversally, and preferably orthogonally in the top view, to the longitudinal direction D1. The width B of a tool unit 9 is the dimension of a tool unit 9 in work position positioned parallel to the longitudinal direction D1.

Each folding axis 12 is parallel to the median plane M, at least in the work position of the respective side unit 4. In the preferred embodiment, each folding axis 12 is parallel to the longitudinal direction D1, at least in work position of the respective side unit 4. Each longitudinal joint 11 is offset on one respective side in relation to the median plane M. The longitudinal joints 11 are located between the rolling axis 8 and the hitching device 5 in side view, in order to distribute the weight of the side units 4 between the tractor 2 and the wheels 7.

As shown on FIG. 3, each side unit 4 may also occupy a transport position in which it is distanced from the ground S. The length L of a tool unit 9 in transport position is substantially parallel to the median plane M, and preferably substantially parallel to the longitudinal direction D1. In this position, the width B of the tool unit 9 is substantially parallel to the median plane M, and preferably substantially orthogonal to the longitudinal direction D1.

In this document, when reference is made to a work position, respectively transport position, it refers to the position of the relevant side unit 4. For example, the work position of a tool unit 9 is the same as the work position of the respective side unit 4.

An important feature of the invention consists in that the machine has at least one tilter 13 articulated with the chassis 3 around at least one tilting axis 14 oriented transversely to the longitudinal direction D1, and that in transport position of the side units 4, each tool unit 9 is closer to the median plane than the respective arm 10.

With such a design, the centre of gravity of each tool unit 9 is moved closer to the median plane M in transport position, which reduces the risk of tilting around an axis parallel to the longitudinal direction D1. Since the weight of a tool unit 9 is greater than that of an arm 10, the centre of gravity of each side unit 4 is also moved closer to the median plane M in the transport position of the tool units 9. The machine 1 is therefore more stable when it moves in transport position of the side units 4 in the bends and the slopes, thus improving the safety of this type of machine 1.

The at least one tilter 13 is articulated with the chassis 3 according to the at least one tilting axis 14 oriented transversally to the longitudinal direction D1, and preferably orthogonally to the median plane M. The at least one tilter 13 can be pivoted with at least one side unit 4 fitted to the tilter 13 via a longitudinal joint 11.

In a simple manner, the machine 1 comprises a tilter 13 which is common for the two side units 4. Each side unit 4 is fitted on a respective side of the tilter 13 (common) via the respective longitudinal joint 11. The pivoting of the tilter 13 around the tilting axis 14 involves the simultaneous pivoting of the side units 4. According to an alternative not shown, each side unit 4 could also be rigidly fastened to a respective part of the tilter 13, around a tilting axis 14, respective or not.

A transition actuator 16 is attached in an articulated manner with, and preferably on the tilter 13. At its other end, the transition actuator 16 is attached in an articulated manner with, and preferably on the chassis 3. A variation in the length of the transition actuator 16 makes the tilter 13 pivot around the tilting axis 14 jointly with the side units 4. The tilter 13 can thus be pivoted, preferably upwards, so as to reach a position in which the folding axes 12 are substantially vertical. Each side unit 4 can then be pivoted around the respective folding axis 12 in the direction, in the top view, from the respective arm 10 to the tool unit 9, and preferably towards the rear. Each side unit 4 can therefore be pivoted around the respective folding axis 12 to a position in which the respective tool unit 9 is closer to the median plane M than the respective arm 10. In the transport position of the side units 4, each tool unit 9 is therefore closer to the median plane M than the respective arm 10.

As shown on FIG. 2, the tilting axis 14 is located at the front or in front of the longitudinal joints 11, at least in work position of the side units 4. It can also be seen in this FIG. 2 that the tilting axis 14 is located in the front, and preferably at the front end of the tilter 13. This feature makes it possible to move all the side units 4 away from the ground S in their transport position, and preferably the longitudinal joints 11, and thus to increase the ground clearance G in this position. The ground clearance G is defined by the minimum distance between the ground S and the side units 4. The machine 1 can thus easily cross a ditch or a high speed bump without risk of being damaged. On FIGS. 2 and 3, each longitudinal joint 11 is achieved by a pivot connection. In a variant, each longitudinal joint 11 could also be achieved by two ball joints and allow at least another degree of freedom between the chassis 3 and each side unit 4.

As can be seen in FIG. 3, the tilting axis 14 is positioned above the wheels 7, which allows the side units to be at least partially higher than the wheels 7 in their transport position, reducing the width 15 of the machine 1. The width 15 is the dimension of the machine 1 according to the direction perpendicular to the median plane M.

The agricultural machine 1 can for example be a mowing machine 1 for mowing standing plants. In this case a tool unit 9 has at least one mowing device 18. In the example embodiments shown in FIGS. 6 and 7, each mowing device 18 is equipped with several rotors 19, such as discs and/or drums. When the machine 1 is driven by the tractor 2, the rotors 19 of at least one mowing device 18 are driven in rotation around substantially vertical axes. The rotors 19 are equipped with blades that extend beyond the periphery of the rotors 19. The rotors 19 from a same mowing unit 18 are placed at more or less regular intervals. In addition, the rotors 19 are set out such that their working trajectories overlap. This means that the blades of a rotor take a trajectory crossed by the trajectory of the blades from an adjacent rotor 19. The rotors 19 are driven in rotation by a set of gears embedded in a sealed housing containing a lubricant. With the forward movement of the machine 1 and rotation of the blades, the blades cut the plants. All the rotors 19 on a side unit 4, and preferably the two side units 4, form a line perpendicular to the longitudinal direction D1 in work position of the tool unit(s) 9 respectively. The tool unit 9 could also comprise a grinder, a collection device such as a pick-up or soil working instruments, such as for example a rotary harrow.

Each tool unit 9 may also have at least one conditioner located, in the work position of the respective tool unit 9 and seen in the direction of advance A, behind the mowing device 18. The conditioner 20 helps to speed up the drying of the mown plants. It can for example be made in the form of a finger roller, or even two relief intermeshing rollers.

As shown in FIGS. 2 and 6, each tool unit 9 also comprises a protection 17. Each tool unit 9 is covered, at least partially, by the protection 17 in its work position. In the case of a mowing machine 1, the protection 17 covers the entire mowing unit 18, and preferably at least half of the conditioner 20 if relevant. The protection 17 may also cover, at least partially, the front and sides of each tool unit 9. The protection 17 may be made in the form of a flexible cover, for example from plastic or carbon fibres, sheet metal or a combination of these materials. As shown in FIG. 3, in transport position of the side units 4, the protections 17 are on the outer sides of the machine 1. The protections 17 located either side of the machine 1, preferably laterally, advantageously prevent access to the inside of the tool units 9 by people in the vicinity, thus improving the safety of the machine 1 in their transport position.

Each tool unit 9 may comprise at least one grouping equipment 21. This grouping equipment 21 is located, seen in the direction of advance A and in the work position, behind the mowing unit 18, and preferably behind the conditioner 20 if relevant. The grouping equipment 21 moves the mown plants in a transverse direction, and preferably perpendicular to the direction of advance A. The grouping equipment 21 makes it possible to collect the mown plants on a width narrower than the width B of the tool unit 9. The grouping equipment 21 collects the plants between the two tool units 9. Each grouping equipment 21 is fitted to the tool unit 9, respectively on a framework 42, and preferably in a mobile fashion, at least laterally, in relation to the tool unit 9 in work position.

As shown in FIG. 3, each grouping equipment 21 is of the endless belt conveyor type. It could also be made in the form of an ejection channel formed by a horizontal wall in work position of the respective side unit 4, under which two lateral walls are fitted, moving closer together at the rear. It can be noted that the grouping equipment 21 is lighter than the mowing device 18, or that the tool (grinder or pick-up) of the tool unit 9 fitted in front of it if relevant. It can be seen in FIG. 3 that each grouping equipment 21 is located above the respective tool unit 9 in transport position. Since the heaviest part of the side unit 4 is closer to the ground S, the result is that in transport position of the side units 4, the centre of gravity of the machine 1 is closer to the ground S, thus improving the stability of the machine 1 when it moves, particularly in bends and/or slopes. Such a feature thus advantageously improves the safety of the machine 1.

An alternative or additional solution for improving the stability of the machine 1 would be to increase the path 38 of the machine 1. The path 38 is the distance between the two wheels 7 according to the rolling axis 8. Another alternative or additional solution would be to increase the width of the wheels 7, i.e. their dimension according to the rolling axis 8. Of course, the comparison of the stability is defined for a same path 38 and a same wheel 7 width.

Each side unit 4 has a respective connection means 26 that links the tool unit 9 to the respective arm 10. In order to be able to move the tool unit 9 in relation to the arm 10, the connection means 26 has at least two rods 27, 28, 29 and at least one actuator 30, 32.

There are preferably three rods 27, 28, 29, i.e. an upper rod 27, an inner rod 28 and an outer rod 29. The inner 28 and outer 29 rods are also designated as "lower rods" 28, 29. Each rod 27, 28, 29 is articulated with the respective arm 10 on the one hand, and with the respective tool unit 9 on the other hand. All rods 27, 28, 29 taken two by two form a deformable quadrilateral with the respective arm 10 and tool unit 9.

Each side unit 4 comprises the framework 42 that links the tool unit 9 to the respective connection device 26. The rods 27, 28, 29 are directly articulated with the framework 42. The framework 42 is rigidly fastened to the respective tool unit 9, and supports it.

The articulations of the rods 27, 28, 29 with the tool unit 9, respectively with the framework 42 and the arm 10 are such that they allow at least a pivoting around axes orthogonal to the median plane M in work position of the respective side unit 4. It can be seen in FIG. 6 that the upper rod 27, with the arm 10, the tool unit 9 and at least one lower rod 28, 29, and preferably both, forms a deformable quadrilateral known as lightening, projecting on the median plane M.

The connection means 26 comprises a lightening actuator 30. Each lightening actuator 30 is articulated with two sides of one of the respective lightening quadrilaterals.

As shown in FIG. 6, in a preferred example embodiment, each lightening actuator 30 is articulated with the respective arm 10 and tool unit 9. A variation in the length of the lightening actuator 30 changes the distance between the tool unit 9 and the arm 10.

Each lightening actuator 30 has a fixed length in all positions except in work position of the respective tool unit 9, where it is mounted in floating configuration. This floating configuration allows the tool unit 9 to move vertically in relation to the combined arm 10. Each tool unit 9 can thus follow the unevenness of the ground S independently of its arm 10.

Each lightening actuator 30 is hydraulically connected to a pressure accumulator in order to dampen the movements of the respective tool unit 9 in work position in relation to the combined arm 10. Each lightening actuator 30 makes it possible to transfer at least part of the weight of the respective tool unit 9 onto the chassis 3. In this way, each tool unit 9 in work position rests only partially on the ground S, thereby making it possible to reduce damage to the plant cover on the ground S.

The respective rods 27, 28, 29 are parallel to one another in projection on the median plane M. Each lightening quadrilateral is thus a parallelogram, which helps maintaining the orientation of the mowing device 18 in relation to the ground S in side view, when this moves vertically in relation to the arm 10. Such a feature ensures regular mowing.

The articulations of the rods 27, 28, 29 with the respective tool unit 9 and arm 10 are such that they allow at least a pivoting around axes substantially parallel to the median plane M, and preferably substantially orthogonal to the longitudinal direction D1, in work position of the respective tool unit 9. Each articulation of the rods 27, 28, 29 with the respective arm 10 as well as with the respective tool unit 9 may be of the cardan or ball-joint type. It is shown in FIG. 2 that each pair of rods 27, 28, 29, with the respective arm 10 and tool unit 9, forms a deformable quadrilateral, known as overlapping quadrilateral, projecting on a plane orthogonal to the median plane M and parallel to the longitudinal direction D1.

Each connection means 26 comprises an overlap actuator 32. Each overlap actuator 32 is articulated with two sides of one of the respective overlap quadrilaterals. As can be seen in FIG. 2, each overlap actuator 32 is preferably articulated with the combined arm 10, respectively the respective support arm 33, and with the respective outer rod 29. A variation in the length of the overlap actuator 32 changes the distance between the respective tool unit 9 and folding axis 12, according to the length of the tool unit 9. The dimension of the machine 1 according to the longitudinal direction D1 may therefore be reduced in transport position.

As shown in FIG. 1, the machine 1 is preferably used in combination with a front equipment 31 hitched to the front of the tractor 2. The spacing E is the distance between each tool unit 9 and the median plane M. The adjustment of the distance between the tool unit 9 and its folding axis 12 also enables adaptation of the spacing E, for example to the width of the front equipment 31.

As shown in FIG. 2, the respective rods 27, 28, 29 are parallel to one another in projection on a plane perpendicular to the median plane M and parallel to the longitudinal direction D1. Each overlap quadrilateral is thus a parallelogram, which makes it possible to keep the length L substantially orthogonal to the longitudinal direction D1.

In an example embodiment that is not shown, each connection means 26 between a tool unit 9 and its arm 10 is achieved by a simple pivot connection with an axis substantially parallel to the folding axis 12.

In the preferred example embodiment, each arm 10 has a respective support arm 33 and rocker 34. Each support arm 33 is articulated with the tilter 13 around the respective folding axis 12, and connected with the respective tool unit 9 by the respective connections means 26. Each rocker 34 is articulated with the respective tilter 13 around the respective folding axis 12. The two rockers 34 are connected by a connection 35 in order to distribute the pressure exerted by the tool units 9 on the ground S.

Each arm 10 comprises a transport actuator 36 articulated with the respective support arm 33 on the one hand and with the respective rocker 34 on the other hand, preferably around axes parallel to the folding axis 12. In work position of the respective tool unit 9, the length of the transport actuator 36 is kept fixed, so that the arm 10 is rigid. Each rocker 34 is articulated with the tilter 13 around an axis parallel to the folding axis 12, and preferably around the respective folding axis 12.

The driving to the machine 1 results in the rotational drive to the rotors 19 of at least one tool unit 9. This driving to the machine 1 is carried out by the power take-off shaft (not shown) of the tractor 2. Other driving forces (electrical, hydraulic, etc.) can however be considered.

The invention also relates to a process for transposing the side units 4 of an agricultural machine 1 between a work position and a transport position, and preferably vice versa. To simplify the writing, the term "transposition" in this document refers to the transposition of at least one side unit 4 between its work position and its transport position.

The transposition comprises a step involving pivoting the side units 4, in relation to the chassis 3, around the tilting axis 14 according to a transitory angle, preferably between 75° and 145°, more preferably between 85° and 115°, and even more preferably between 90° and 100°. The pivoting of a side unit 4 according to the transitory angle takes place until it reaches a position where its rear end 23 is on the top. The rear end 23 is the part located at the back of a side unit 4 in work position. When pivoting the side unit 4 according to the transitory angle, the rear end 23 pivots upwards, and preferably forwards. The pivoting of the side unit 4 according to the transitory angle ends in the transitory position of the respective side unit 4 as shown in FIG. 7. This pivoting ends in a position in which the respective folding axis 12, in side view, forms an angle with the longitudinal direction D1 of between 45° and 90°, and preferably between 75° and 90°.

The pivoting of the/a tilter 13 around the tilting axis 14 according to the transitory angle transmits its pivoting to at least one side unit 4, and preferably to both. In the preferred example embodiment, the pivoting of the side angle 4 according to the transitory angle is achieved after its pivoting according to the operation angle.

The transposition also comprises a step involving pivoting each side unit 4, in relation to the chassis 3, around the respective folding axis 12 according to a major angle preferably between 80° and 140°, and more preferably between 100° and 120°. When a side unit 4 pivots according to the major angle, the side unit 4 concerned pivots in the direction opposite the arm 10, around the folding axis 12. When the side unit 4 pivots according to the major angle, its outer end 25 pivots, preferably towards the rear, to a position in which the length L and width B of a tool unit 9 are substantially parallel to the median plane M. The outer end 25 is the part located outside of a side unit 4 in work position. It may be planned that the pivoting of a side unit 4 according to the major angle results in a position in which the length L of a tool unit 9 forms an angle of between 0° and 25°, and more precisely between 0° and 5°, with the median plane M.

The transport actuator 36 is positioned such that the respective side unit 4 pivots according to the major angle. Preferably the pivoting of the side unit 4 according to the major angle is achieved following pivoting of the side unit 4 according to the transitory angle. In a simple example embodiment, the transposition of a side unit 4 between its work position and its transport position comprises only the pivotings of the side unit 4 according to the major angle and according to the transitory angle.

In the preferred example embodiment, the pivotings of the side unit 4 according to the major angle and according to the transitory angle are at least partially simultaneous, preferably at least during the final phase (timing) of the pivoting of the side unit 4 according to the transitory angle, which prevents the side units 4 from hitting the ground S during the transposition, while shortening the latter. The fact that the side units 4 do not pivot around their respective folding axis 12 until the tilter 13 has reached a certain orientation in relation to the ground S, namely at least 60°, preferably 70°, and even more preferably 80°, prevents the side units 4 from hitting the ground S during their pivoting around their respective folding axis 12.

To prevent contact between the tool units 9 and the ground S when the machine 1 is moved (whether or not it is driven), it is provided for each side unit 4, respectively tool unit 9, to occupy an operation position. As shown in FIG. 5, the outer end 25 of a tool unit 9 in operation position is further away from the ground S than its inner end 24.

The transposition may comprise a step involving pivoting at least one side unit 4, and preferably both, in relation to the chassis 3, around the respective folding axis 12 according to an operation angle, preferably between 5° and 45°, and even more preferably between 10° and 20°, so that it reaches its operation position. It can be noted that the pivoting of a side unit 4 according to the operation angle is separate from the pivoting of this side unit 4 according to the major angle.

A headland actuator 40 is articulated with each rocker and with the chassis 3, respectively the tilter 13, preferably around axes parallel to the folding axis 12. A variation in the length of the headland actuator 40 pivots the respective side unit 4 around the respective folding axis 12. When a side unit 4 pivots according to the operation angle, the side unit 4 concerned pivots in the direction of the arm 10, around the folding axis 12. The pivoting of a side unit 4 according to the operation angle makes it possible to transfer it between its work position and its operation position. In the preferred example embodiment, the pivoting of the side unit 4 according to the operation angle is the transposition step performed first, carried out respectively before the pivoting of the side unit 4 according to the transitory angle. In this preferred example embodiment, when a side unit 4 has completed its pivotings according to the operation angle, according to the transitory angle and according to the major angle, it occupies an intermediate position.

In the simple example embodiment, from the work position, the pivotings of a side unit 4 according to the transitory and major angles may end in its transport position, with the intermediate position being the transport position.

In order to transfer part of the weight of the tool unit 9 to the wheels 7, it can be advantageously provided for each side unit 4 to rest on a stand 41 in the transport position. The stand 41 is rigidly fastened to the chassis 3, and preferably located above the wheels 7 in side view of the machine 1.

To this effect, the transposition may comprise a step, preferably the last, that involves pivoting a side unit 4, preferably both, in relation to the chassis 3, around the tilting axis 14 according to a final angle, preferably less than 30°, and more preferably less than 15°. Following the pivoting of the side unit 4 according to the final angle, this rests on the stands 41. The transition actuator 16 enables the side unit 4 to pivot according to the final angle. It will be noted that the pivoting of a side unit 4 according to the final angle is separate from the pivoting of this side unit 4 according to the transitory angle.

In the preferred example embodiment, the pivoting of the side unit 4 according to the final angle is achieved from its intermediate position. Following the pivoting of the side unit 4 according to the final angle, the side unit is in the transport position shown in FIG. 3. In transport position of the side units 4, each rear end 23 is oriented upwards.

The height H of a tool unit 9 in transport position is oriented substantially perpendicular to the median plane M. The width 15 in transport position of the side units 4 is determined by the sum of the heights H of the tool units 9. Since the height H is the smallest of the three dimensions of a tool unit 9, the width 15 is advantageously reduced in transport position.

The transposition may comprise a step that involves moving each tool unit 9 in relation to the respective arm by a translation in which at least one component is oriented according to the height H of the respective tool unit 9, preferably carried out in the operation position of the relevant side unit 4. Thanks to this translation the width 15 is further reduced in transport position. Furthermore, in transport position of the side units 4, the distance between each tool unit 9 and the median plane M can be repeated.

The transposition may comprise a step that involves moving each tool unit 9 in relation to the respective arm by a translation in which at least one component is oriented according to the length L of the respective tool unit 9. In this way, the position of the tool unit 9 in transport position according to the longitudinal direction D1 can be repeated. The translation of a side unit 4 in which at least one component is oriented according to the length L is preferably carried out in the operation position of the side unit 4, preventing damage to the plant cover on the ground S. Thanks to this translation the length of the machine 1 is reduced in transport position.

It can be noted that it is possible to carry out the transposition of the two side units 4 between their respective work position and transport position at the same time. It is also possible that a single side unit 4 carries out the operation pivoting to reach a partial work position. In the partial work position, one side unit 4 is in work position and the opposite side unit 4 is in operation position.

The actuators 16, 30, 32, 36, 40 are preferably made from hydraulic cylinders connected to the hydraulic circuit of the tractor 2, and controlled preferably by the hydraulic system of the tractor 2. They may however also be made from pneumatic cylinders and/or hydraulic or electrical motors, or even springs.

The transfer of a side unit 4 between its transport position and its work position is carried out preferably by operating the steps in reverse order and in the order contrary to the transposition of a side unit 4 from its work position to its transport position.

The machine that has just been described is only an example embodiment which does not limit the field of protection defined by the following claims.

What is claimed as new and desired to be secured by Letters Patent of the United States is:

1. An agricultural machine intended to be hitched to a tractor, the agricultural machine comprising:
   two side units; and
   a chassis that extends in a longitudinal direction and is equipped with two wheels,
   each side unit fitted to pivot in relation to the chassis via a respective longitudinal joint around a respective folding axis parallel to a median plane of the chassis;
   each side unit has a tool unit attached to the chassis by a respective arm and can occupy a working position in which it the side unit rests on the ground and in which a length of the respective tool unit extends transversely to the longitudinal direction;
   each side unit can also occupy a transport position in which the side unit is distanced from the ground and in which the length and width of the respective tool unit are substantially parallel to the median plane,
   wherein the machine has at least one tilter articulated with the chassis around at least one tilting axis positioned transversely to the longitudinal direction,
   wherein the transport position of the side units, each tool unit is closer to the median plane than the respective arm,
   wherein each tool unit comprises at least one mowing unit and at least one grouping equipment located, seen in the direction of advance, behind the respective mowing unit in the working position, and
   wherein each grouping equipment is located above the respective tool unit in the transport position.

2. The agricultural machine according to claim 1, wherein the agricultural machine comprises a tilter common for the two side units.

3. The agricultural machine according to claim 1, wherein the tilting axis is located in front of the longitudinal joints, at least in the working position.

4. The agricultural machine according to claim 1, wherein each tool unit is covered, at least partially, by a protection in the working position and that in the transport position, the protections are located on outer sides of the machine.

5. The agricultural machine according to claim 1, wherein each side unit comprises a respective connection means which connects the tool unit to the arm and which comprises at least two rods and at least one actuator.

6. A method for transposing the side units of an agricultural machine between a work position and a transport position, the machine comprising two side units and a chassis which extends in a longitudinal direction, each side unit being fitted to pivot in relation to the chassis via a respective longitudinal joint around a respective folding axis that is substantially parallel to a median plane of the chassis; each side unit being able to occupy a work position in which the side unit rests on the ground and in which the length of the respective tool unit extends transversely to the longitudinal direction, the following steps method comprising:

pivoting the side units around a tilting axis, oriented transversely to the longitudinal direction, according to a transitory angle of between 75° and 145°, and pivoting each side unit around the respective folding axis according to a major angle of between 80° and 140°, wherein each side unit has a tool unit attached to the chassis by a respective arm, each tool unit comprising at least one mowing unit and at least one grouping equipment located, seen in the direction of advance, behind the respective mowing unit in the work position of the respective tool unit, and wherein each grouping equipment is located above the respective tool unit in the transport position.

7. The method according to claim 6 further comprising pivoting each side unit around the respective folding axis according to an operation angle of between 5° and 45°.

8. The method according to claim 6, further comprising pivoting the side units around the tilting axis according to a final angle of less than 30°.

9. The method according to claim 6, further comprising moving each tool unit in relation to the arm to which the tool unit is connected, by a translation in which at least one component is oriented according to a height of the respective tool unit.

* * * * *